Patented Mar. 5, 1935

1,992,958

UNITED STATES PATENT OFFICE 1,992,958

PREPARATION OF ORGANIC ACID ESTERS OF CELLULOSE

Carl J. Malm and Charles L. Fletcher, Rochester, N. Y., assignors to Eastman Kodak Company, Rochester, N. Y., a corporation of New York No Drawing. Application December 29, 1932, Serial No. 649,360

4 Claims. (Cl. 260—101)

The present invention relates to the preparation of cellulose esters in which the cellulose is esterified in two steps, the first being carried out rapidly and with insufficient organic acid anhydride to completely esterify the cellulose and the second being carried out slowly and in the presence of sufficient organic acid anhydride to complete the esterification.

At the present time in the manufacture of organic acid esters of cellulose such as cellulose acetate there is much danger of degradation of the cellulose molecule during the process. It appears that this degradation danger is especially pronounced at the start of the reaction and also towards the end thereof.

Stepwise processes for the acetylation of cellulose have been carried out in which fractional portions of a whole acetylation mixture are added to the cellulose at intervals over the course of the acetylation. In those processes the acid anhydride was added slowly in the beginning of the esterification and after the cellulose had a content of about 10–15% acetyl, the rest of the anhydride was added and the esterification was finished rather rapidly. We have found that when an acetylation process is carried out the degrading action on the cellulose, if any, occurs thru the action of the mineral acid catalyst on the cellulose before the cellulose is protected by acyl groups or thru the acetolysis of the cellulose by the action of the acid anhydride upon the cellulose ester towards the end of the esterification. Thus in the case of acetylation processes up to the present, whether or not they were stepwise, there has been the constant danger of degradation at either the beginning or the end of the process unless precautions of one sort or another were taken.

One object of our invention is to provide a process for preparing organic acid esters of cellulose in which the danger of degradation is reduced to a minimum. Another object of our invention is to inhibit the degrading action in acylation processes which is more pronounced at the beginning and the end of the usual processes. Another object of our invention is to provide a stepwise process for the esterification of cellulose which avoids degradation and yet takes place in much less time than is the case with the stepwise esterification processes of the prior art.

We have found that the danger of degradation of the cellulose in the earlier stages of its esterification may be inhibited by combining a substantial proportion of acyl groups therewith as rapidly as is possible from a practical standpoint. We have found that the other danger of degradation of the cellulose molecule, namely by acetolysis or the like near the end of the esterification may be minimized by avoiding the presence of an excess of the acid anhydride especially in the latter stages of the esterification process.

We have found that the danger of degradation of the cellulose in its esterification can be inhibited if an amount of organic acid anhydride sufficient to esterify the cellulose up to a content of about 30–40% combined acyl is added at the beginning of the esterification which is then allowed to proceed rather rapidly until action has ceased. In this way the cellulose is protected by acyl groups from the degrading action of the mineral acid catalyst. At this point, the only danger of degrading the cellulose is thru acetolysis and to avoid an excess of acid anhydride in the bath, the amount of anhydride necessary to finish the reaction during a period of several hours is slowly added. In this second step, a very slow esterification up to a fully esterified product is accomplished in the presence of a very small excess of acid anhydride. It is advantageous in carrying out this second step to add the anhydride at such a rate that the difference between the temperature of the esterification bath and that of the jacket of the reaction vessel is kept constant. Altho this part of the process embodies a slow reaction, as there is only a small percentage of acyl groups which must be combined with the cellulose to result in a fully esterified product the time consumed thereby will be relatively small compared to the ordinary acetylation process. As soon as the dope is free from grain and fiber, the addition of the anhydride may be stopped and hydrolysis may then be carried out in the usual way.

The following example is illustrative of the application of our invention in a process of preparing cellulose acetate:

25 lbs. of cotton linters containing about 1.5% moisture was treated with a mixture of 160 lbs. of glacial acetic acid, 10 lbs. of 85% acetic anhydride and 100 c. c. of 95% sulfuric acid for 3 hours at 100° F. At the end of this time the mass was cooled to 60° F. and 40 lbs. of 85% acetic anhydride was added. The temperature was allowed to rise from 60–100° F. during a period of 4–5 hours. All the acetic anhydride has now been used up as indicated by a drop in the temperature of the reaction mass. Acetic anhydride is then added at the rate of about 4 lbs. per hour over a period of about 3–4 hours while keeping the reaction mixture at a temperature between 95° and 100° F. A very viscous dope free from grain and fiber was obtained. The mass was then subjected to hydrolysis in the usual manner and the resulting cellulose acetate was precipitated therefrom, washed and dried.

The present invention is also applicable to the preparation of other organic acid esters of cellulose and in that case it would be necessary to calculate the amount of acid anhydride which would kill the moisture and also esterify the cellulose to a content of 30–40% acyl. This amount would be added in the first step of rapid esterification. The simple esters of cellulose such as cellulose propionate or butyrate or the mixed esters such as cellulose acetate propionate or acetate butyrate may be prepared by this process. In the case of the mixed esters the anhydrides of the corresponding acyl groups to be introduced may be mixed or the cellulose may be esterified up to a content of 30–40% acyl in the first step by an anhydride corresponding to one of the acyl groups which is to be introduced and the second step may be carried out with the employment of the anhydride corresponding to the other acyl group to be introduced. Thus the content of various acyl groups in a cellulose mixed ester may be controlled to a certain extent.

If desired by the individual operator only one of the features of our invention may be employed in a particular esterification process to which it is adaptable. For instance if in a process for preparing certain cellulose esters there is but slight danger of acetolysis but the danger of degradation by the mineral acid catalyst at the beginning of the process might be acute, the first step might be carried out in accordance with the present invention by rapidly esterifying the cellulose with only sufficient acid anhydride to give a content of 30–40% acyl and the second step might be carried out differently than prescribed by us to avoid acetolysis, such as adding in one portion the remaining anhydride necessary to complete the substantially full esterification of the cellulose. On the other hand if there is little danger from degradation in the first part of an esterification process but acetolysis is to be avoided, the esterification up to an acyl content of 30–40% may be carried out in the usual manner except that only sufficient esterifying agent is employed in that first step to give only the 30–40% acyl and then to avoid subsequent acetolysis the second step might be carried out in accordance with our invention, namely by adding the anhydride necessary to complete the esterification slowly and over a relatively long period of time.

The products of the esterification of cellulose according to our invention are characterized by a high viscosity especially in acetone compared with like cellulose esters having approximately the same acyl content. As is well-known the cellulose esters having a low viscosity in acetone produce films or sheets which are brittle while the esters which are characterized by relatively high viscosity in acetone over the whole range of their hydrolysis, between the points where they are acetone-soluble, produce sheets or films of good flexibility when coated out from acetone. The high viscosity esters of cellulose prepared according to the present invention were found to give flexible sheets or films which are eminently suitable for use in the various capacities in which cellulose ester sheets are employed at present such as the base of photographic film, wrapping material, etc.

Various modifications of our invention according the judgment and desires of the individual operator are also to be understood as being within the scope of our invention as defined by the claims appended hereto. For instance in the second step of the acetylation in which the anhydride is added continuously to the esterification bath, the continuous addition may be either drop by drop, in a small pouring stream or in small amounts at fairly frequent intervals.

We claim as our invention:

1. In the preparation of an organic acid ester of cellulose in which cellulose is esterified with an organic acid anhydride in the presence of a catalyst, the steps of protecting the cellulose against degradation which comprise the preliminary partial esterification of the cellulose with a bath containing a catalyst and an amount of organic acid anhydride sufficient only to esterify the cellulose to a content of 30–40% acyl and then continuously adding an amount of an organic acid anhydride thereto at least sufficient and not substantially in excess of that necessary to complete the esterification, over the major portion of the period employed to complete the esterification.

2. In the preparation of an organic acid ester of cellulose in which cellulose is esterified with an organic acid anhydride in the presence of a catalyst, the step which comprises reacting upon a cellulose, which has been reacted upon by an amount of anhydride sufficient only to esterify it to an acyl content of 30–40%, with organic acid anhydride which is continuously added during the major portion of the step, in an amount at least sufficient and not substantially in excess of that required to complete the esterification.

3. In the preparation of cellulose acetate in which cellulose is esterified with an acetic anhydride in the presence of a catalyst, the steps of protecting the cellulose molecule against degradation which comprises the preliminary partial esterification of the cellulose with a bath containing a catalyst and an amount of acetic anhydride sufficient only to esterify the cellulose to an acetyl content of 30–40% and then continuously adding an amount of acetic anhydride thereto at least sufficient and not substantially in excess of that required to complete the esterification over the major portion of the period employed to complete the esterification.

4. In the preparation of cellulose acetate in which cellulose is esterified with acetic anhydride in the presence of a catalyst, the step which comprises reacting upon a cellulose, which has been reacted upon by an amount of acetic anhydride sufficient only to esterify it to an acetyl content of 30–40% with acetic anhydride which is continuously added during the major portion of the step, in an amount at least sufficient and not substantially in excess of that required to complete the esterification.

CARL J. MALM.
CHARLES L. FLETCHER.